(12) United States Patent
Banerjee et al.

(10) Patent No.: US 7,885,852 B2
(45) Date of Patent: Feb. 8, 2011

(54) SERVICE DISCOVERY IN A NETWORK OF AUTOMATIC PRODUCT/SERVICE DISPENSING MACHINES

(75) Inventors: Dwip N. Banerjee, Austin, TX (US); Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2320 days.

(21) Appl. No.: 09/965,152

(22) Filed: Sep. 27, 2001

(65) Prior Publication Data
US 2003/0061094 A1 Mar. 27, 2003

(51) Int. Cl.
G06Q 30/00 (2006.01)
(52) U.S. Cl. ..................................... 705/14.1
(58) Field of Classification Search ................... 705/14, 705/14.1
See application file for complete search history.

(56) References Cited

U.S. PATENT DOCUMENTS

| | | | |
|---|---|---|---|
| 4,679,150 A | 7/1987 | Hayashi et al. | 364/479 |
| 5,207,784 A | 5/1993 | Schwartzendruber | 221/6 |
| 5,637,845 A | 6/1997 | Kolls | 235/381 |
| 5,769,269 A | 6/1998 | Peters | 221/7 |
| 5,956,694 A * | 9/1999 | Powell | 705/14.38 |
| 6,012,050 A | 1/2000 | Eaton et al. | 705/42 |
| 6,061,660 A * | 5/2000 | Eggleston et al. | 705/14 |
| 6,161,059 A | 12/2000 | Tedesco et al. | 700/232 |
| 6,324,520 B1 * | 11/2001 | Walker et al. | 705/16 |
| 7,084,737 B1 * | 8/2006 | Moore et al. | 340/5.91 |
| 7,249,050 B1 * | 7/2007 | Walker et al. | 705/14 |
| 2005/0060062 A1 * | 3/2005 | Walker et al. | 700/236 |

FOREIGN PATENT DOCUMENTS

| | | |
|---|---|---|
| EP | 1024628 A1 | 8/2000 |
| WO | WO 99/38125 | 7/1999 |

* cited by examiner

Primary Examiner—Daniel Lastra
(74) Attorney, Agent, or Firm—Yee & Associates, P.C.; Jeffrey S. LaBaw

(57) ABSTRACT

A method, system, and computer program product for providing products to a user via an automated product dispensing machine is provided. In once embodiment, an automatic product dispensing machine in a micronetwork of proximally located diverse automatic product dispensing machines receives a request for an item. Responsive to a determination that the item is unavailable at a current automatic product dispensing machine, the automatic product dispensing machine provides a user with an alternative redemption product, such as, for example, a coupon that may be redeemed at another automatic product dispensing machine or at a nearby store.

6 Claims, 7 Drawing Sheets

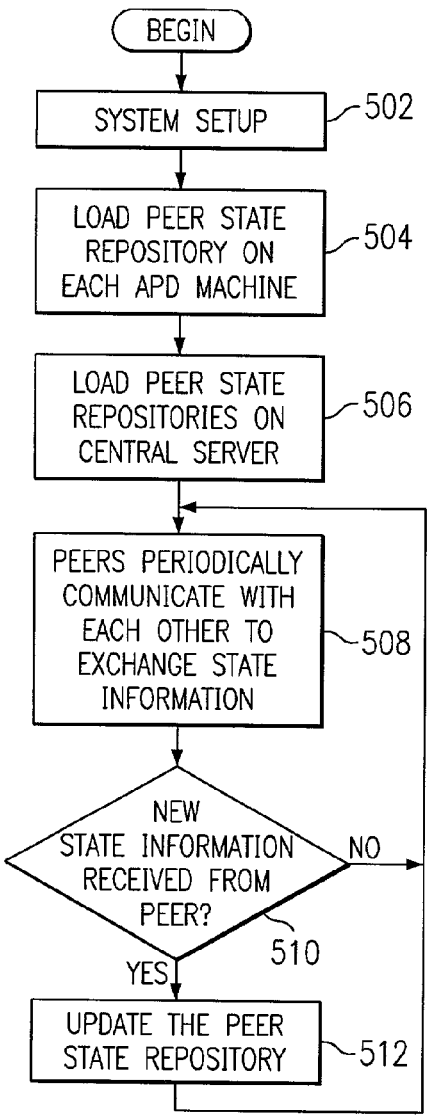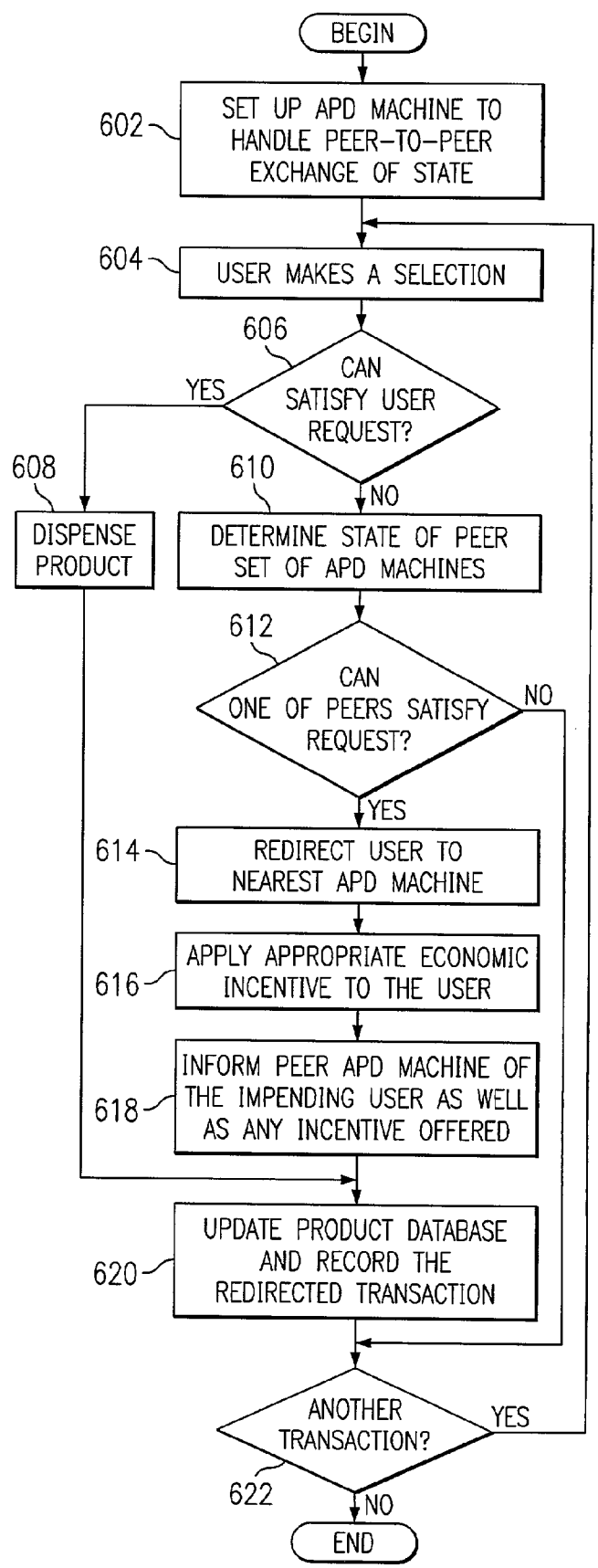

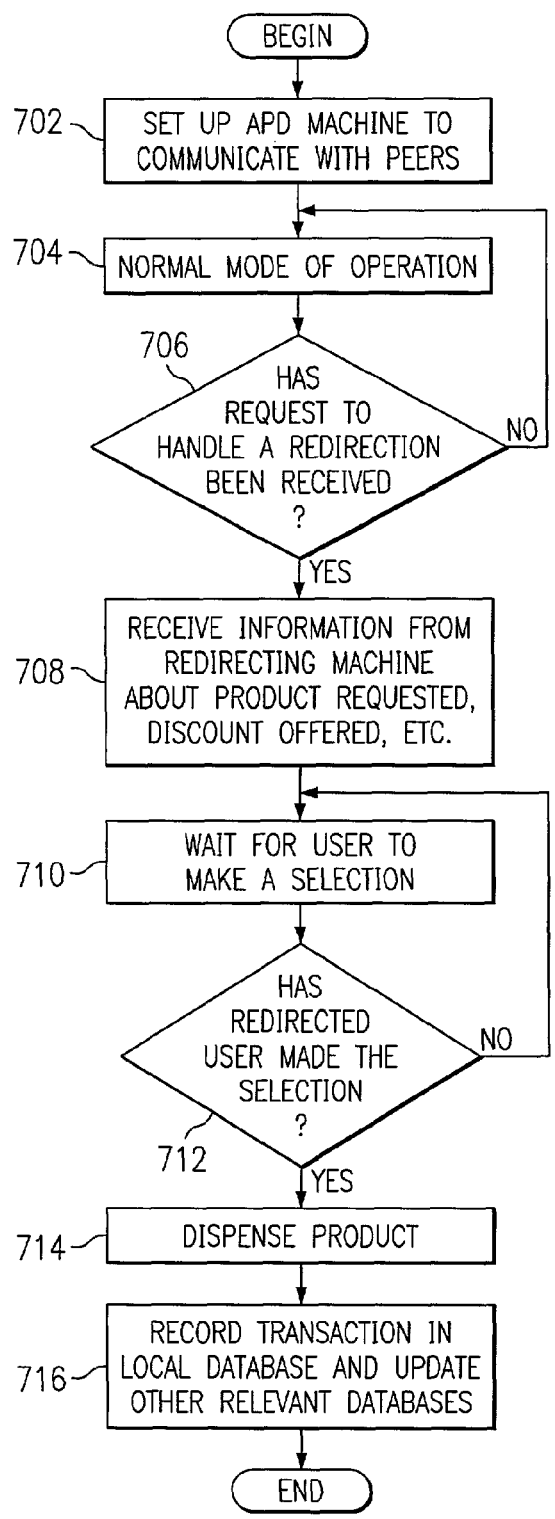
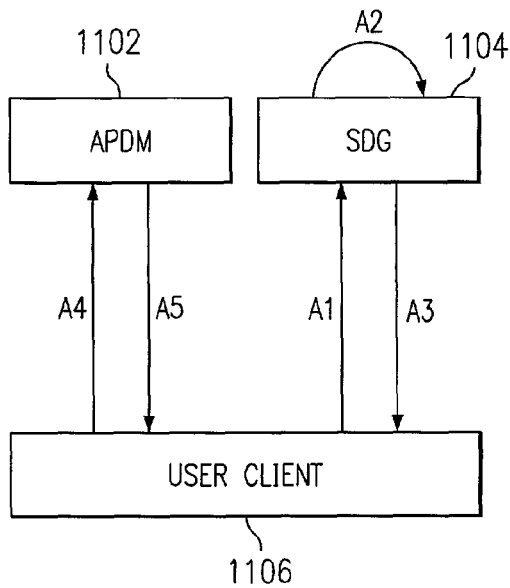
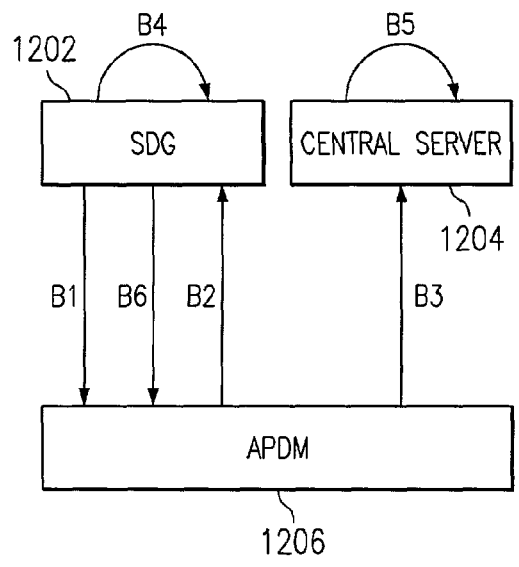

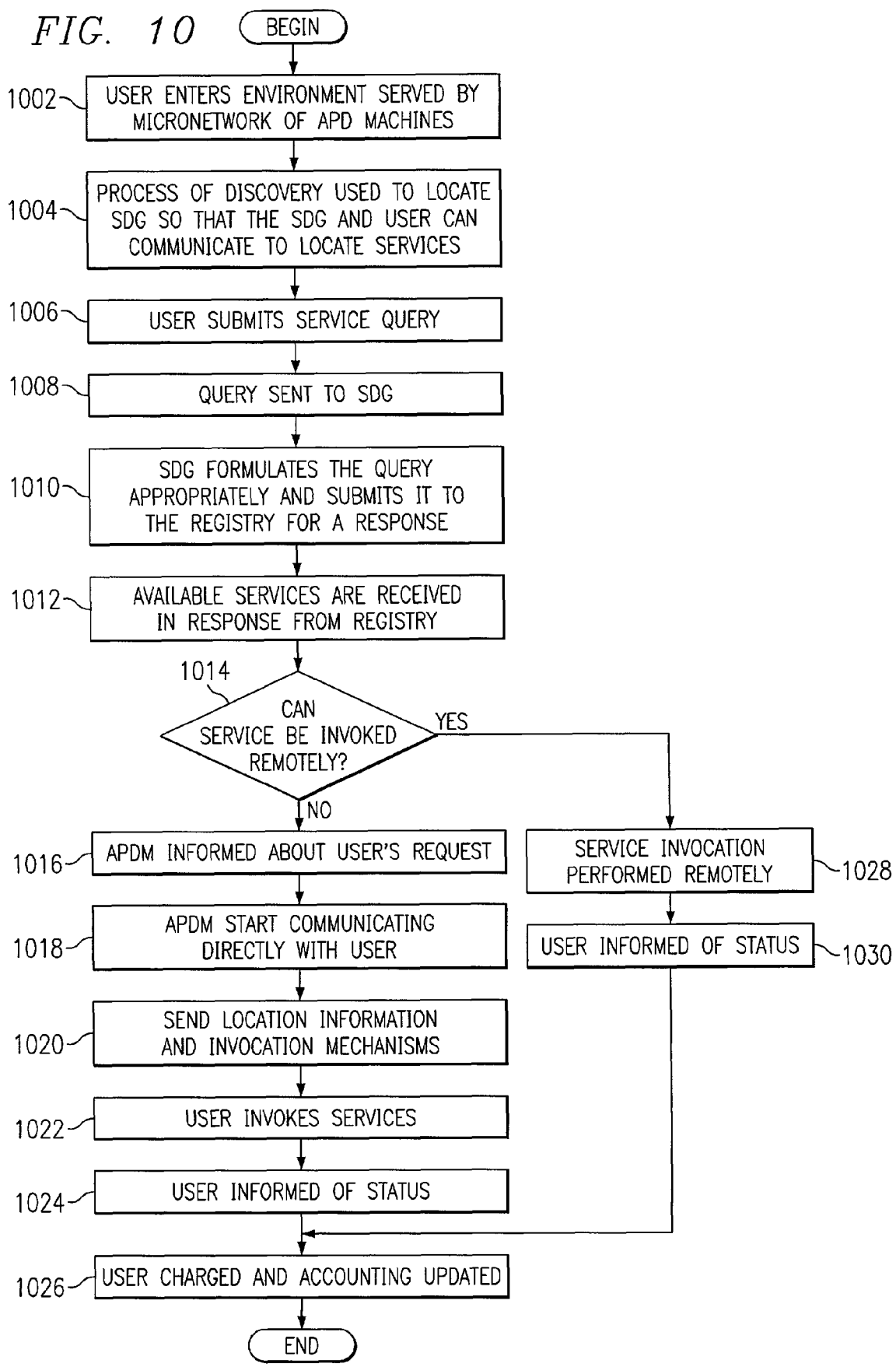

ically tools 106 manages the inventory...

SERVICE DISCOVERY IN A NETWORK OF AUTOMATIC PRODUCT/SERVICE DISPENSING MACHINES

BACKGROUND OF THE INVENTION

1. Technical Field

The present invention relates to computer software and, more particularly, to methods of distributing products via automatic product dispensing machines.

2. Description of Related Art

Automatic product dispensing machines (i.e. vending machines) are a useful mechanism by which to serve customers through instantaneous dispensation of chosen products. However, the exhaustion of a machine's supply of a specific item can be a source of irritation and aggravation to the user who has traveled to the machine in search of that specific product or has to settle for another product. Also, many times the operator of the vending machines simply loses a potential sale due to the user giving up on finding the desired product.

Currently, it is possible to find out about services in wide area networks (WANs) or the Internet using Wireless Application Protocol (WAP) (e.g., find out about Chinese restaurants within a three mile radius of the current location). Such services are typically very broad (e.g., it will be hard or impossible to find a service that provides information about where to find a specific menu item, such as dumplings). Moreover, such services are not available in micronetworks, as in buildings or other similar environments. Therefore, it would be desirable to provide a system, method, and computer program product for providing and/or redirecting a user to an appropriate machine or location at which the user may obtain the services or products desired.

SUMMARY OF THE INVENTION

The present invention provides a method, system, and computer program product for providing products to a user via an automated product dispensing machine. In once embodiment, an automatic product dispensing machine in a micronetwork of proximally located diverse automatic product dispensing machines receives a request for an item. Responsive to a determination that the item is unavailable at a current automatic product dispensing machine, the automatic product dispensing machine provides a user with an alternative redemption product, such as, for example, a coupon that may be redeemed at another automatic product dispensing machine or at a nearby store.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts an exemplary process flow and program function updating inventories in an APD system in accordance with the present invention;

FIG. 6 depicts an exemplary process flow and program function for redirecting a user from an APD machine incapable of satisfying a user's request to another APD Machine capable of satisfying the user's request in accordance with the present invention;

FIG. 7 depicts an exemplary process flow and program function for handling, in an APD machine, a redirected transaction from another APD machine in accordance with the present invention;

FIG. 10 depicts an exemplary process flow and program function for allowing a user to discover the location of products and services available within a micronetwork in accordance with the present invention;

FIG. 11 depicts a message flow diagram illustrating the discovery of services available in an environment served by a micronetwork in accordance with the present invention; and FIG. 12 depicts a message flow diagram illustrating the process of registering an APD machine with a service discovery gateway in accordance with the present invention.

DETAILED DESCRIPTION OF THE PREFERRED EMBODIMENT

Figure 1:
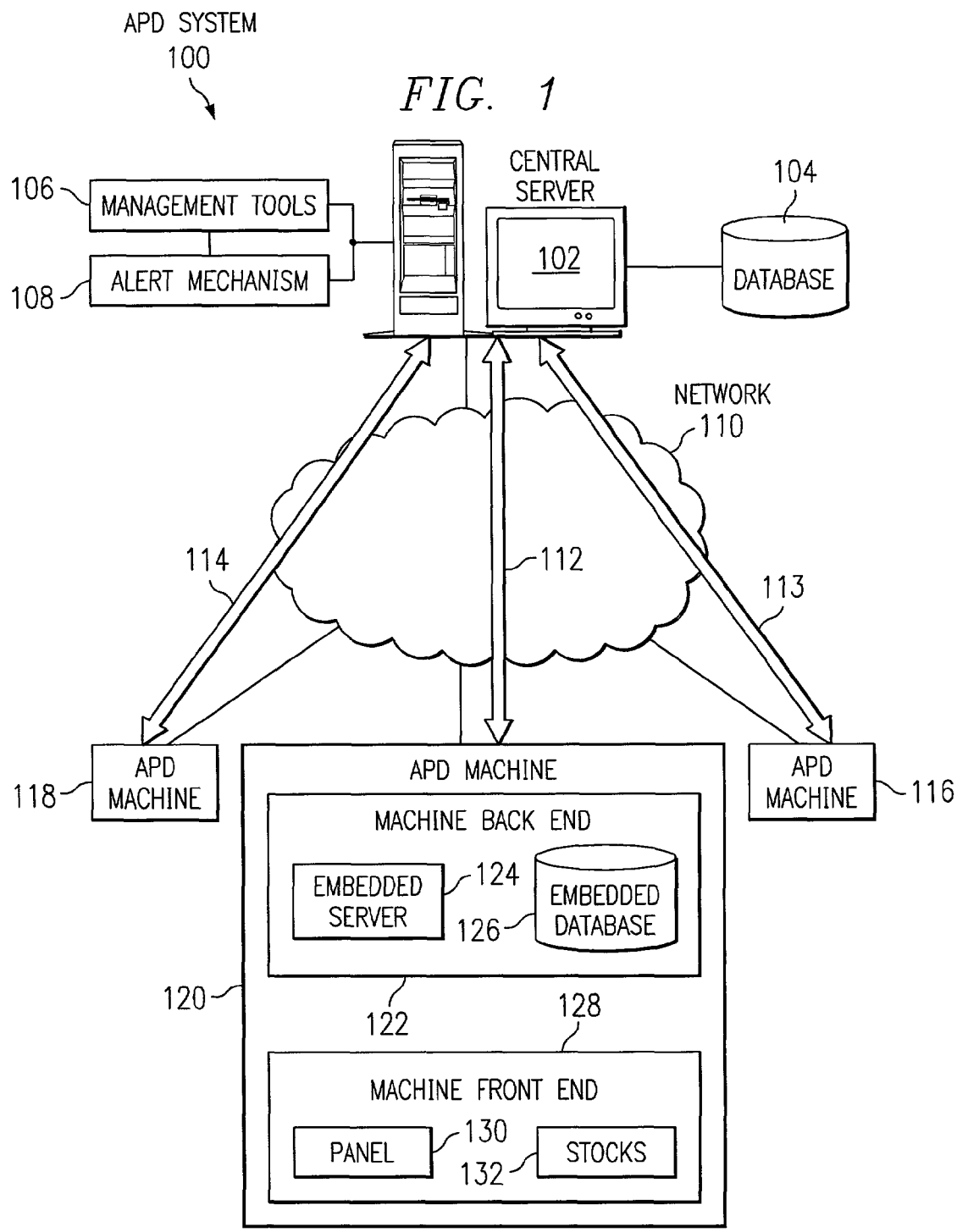
FIG. 1 depicts a block diagram of an automated product dispensing system in accordance with the present invention.

With reference now to FIG. 1, a block diagram of an automated product dispensing system is depicted in accordance with the present invention. Automated product dispensing (APD) system 100 is a system for automatically dispensing products, coupons, or services. For example, APD system 100 may be a system for vending soft-drinks, snack foods, coupons, and/or tickets. However, these are only a few of the more common products and services dispensed using APD system 100. Many other products and services may be used in conjunction with APD system 100. Therefore, the present invention is not limited to the products and services enumerated above.

APD system 100 includes a central server 102 that is connected to or includes management tools 106, alert mechanism 108, and database 104. Database 104 stores the available inventory of each APD machine 118, 118, and 120 within APD system 100. Management tools 106 manages the inventory of each APD machine 116, 118, and 120 within APD system 100. The alert mechanism 108 alerts an identified one of APD machines 116, 118, and 120 of a redirection and coupon or discount to be applied if a user selects a product or service from one APD machines 116, 118, and 120 that is unable to satisfy the user's request. Central server 102 is connected 112-114 to a plurality of APD machines 116, 118, 120 through network 110. Network 110 may be, for example, a micro area network, a local area network (LAN), a wide area network (WAN), the Internet, or a wireless network.

An APD machine 120 includes a machine front end 128 and a machine back end 122. The machine front end 128 includes a panel 130 for a user to interface with the APD machine 120 and product or service stocks 132. The panel 130 allows a user to select a desired product or service from the products or services offered by the APD system 100 as well as provides a means for receiving payment from the user. The means for receiving payment may be, for example, a receptacle and mechanism for receiving coins and/or paper currency, determining the amount received and providing change if necessary. The means for receiving payment may also be a card reader for reading a credit, charge, debit card, or smart card. Other embodiments may include means for receiving electronic funds through the user of wireless electronic devices such as, for example, wireless telephones and personal digital assistants (PDAs). Means, such as those enumerated above, for collecting payment are well known in the art. Once payment is received, products or services are dispensed to the user from available stocks 132.

The machine back end 122 includes an embedded server 124 and an embedded database 126. The embedded server 124 monitors the available inventory of products and/or services available in the APD machine 120 and updates an inventory stored in embedded database 126 as changes occur to the available stock 132. Embedded server 124 also communicates with central server 102 to update the central server 102 with current inventories. Central server 102 then updates its database 104 with the updated inventory from APD machine 120. Database 104 also contains inventory information about the available stocks of products and/or services in other APD machines 116 and 118 within APD system 100.

If a user requests a product or service currently unavailable within APD machine 120, a message is sent from APD machine 120 to central server 102 notifying the server 102 that a product that is unavailable from the current APD machine 120 has been requested by a user and requesting that the central server 102 provide the identity and location of an alternative APD machine 116 and 118 from which the user may obtain the desired product and/or service. The central server 102 then identifies another APD machine 116 and 118 that is able to fulfill the user's request. The identity and location of the alternative APD machine 116 or 118 is sent to APD machine 120 and presented to the user through panel 130. The central server may identify only one alternative, no alternatives, or several alternative.

Once the user has been presented with the notification that the selected product is unavailable at the current location, the user may then select an alternative product from the current APD machine 120 or may select the alternative option provided by central server 102, or decide to abandon the transaction altogether. If the user selects the alternative provided by central server 102, then, if there are more than one potential options, the user is asked to select the specific option. The user is then presented with the identity and location of the alternative APD machine 116 or 118 and possibly with a coupon redeemable at the alternative location to compensate for and appease the user's dissatisfaction at being unable to obtain the desired product at the current APD machine 120. The location information provided to the user may include a map or directions on how to travel to the alternative APD machine 116 or 118 from the current APD machine. In some embodiments, this location information may be provided to the user before asking the user to select an alternative, thus allowing the user to determine whether the alternative is close enough to be worth, in the judgment of the user, traveling.

The alternative APD machine 116 or 118 selected by the user is then notified of the selection by central server 102 after the central server 102 has been notified by APD machine 120. The alternative APD machine 116 or 118 is also notified of any coupons dispensed to or credited to the user. For example, if the user uses a smart card, electronic device, credit card, charge card, or debit card, the central server 102 may send identity information about the payment device to the alternative APD machine 116 or 118. Thus, when the alternative APD machine 116 or 118 is presented with the payment device previously used by the user at the first APD machine 120, the alternative APD machine 116 or 118, with notice of an appropriate coupon or discount value to be given to the user, will deduct an appropriate amount from the price of the selected product or service and charge the user the adjusted lower price for the product or service.

Thus, by redirecting the user to another APD machine within the APD system 100, the operators avoid losing a potential transaction because of the unavailability of a product at a particular APD machine 116, 118, and 120. Furthermore, the user is satisfied because, rather than having to select an alternative product not as well liked by the user or having to not receive the chosen product at all, the user is directed to a location that is able to satisfy the user's request. Also, although a coupon or discount does not have to be dispensed, the operator of the APD system 100 may wish to provide the user with a discount or coupon to generate good will.

In circumstances in which a coupon is dispensed along with the redirection, in order to prevent user's from taking advantage of the system, the APD system 100 may limit the number of coupons a given user may receive during any given time period. Thus, a user may be prevented from deliberately seeking out and selecting an APD machine 116, 118, and 120 that the user knows cannot satisfy his request just to obtain a discount or coupon on the item. Also, in some embodiments, the discount or coupon may have a valid time period associated with it such that it is only valid for some short time after the user attempts but is unable to obtain a product from a particular APD machine 116, 118, and 120. Thus, user's are prevented from obtaining coupons and/or discounts for products or service, that a user has no current desire for, but merely to have a discount on the item at some later time when the user desires to purchase the product or service.

APD system 100 has been described primarily in terms of obtaining a product or service not currently available at a given APD machine 116, 118, and 120 with an implication that the given APD machine 116, 118, and 120 is currently out of the product or service, but sometimes contains the product or service. However, the present invention is not limited to the case in which an APD machine is currently out of an inventory item normally stocked, but may also include situations in which a particular APD machine 116, 118, and 120 does not ever or seldom ever carries the requested product, but other APD machines 116, 118, and 120 within APD system 100 do. In such circumstance, the user would be directed to an appropriate APD machine 116, 118, and 120 in the same fashion as described above.

APD system 100 is provided merely as an example of an APD system and is not meant to imply any architectural limitation to the present invention. For example, APD system 100 may include many more APD machines than depicted in FIG. 1. Furthermore, rather than providing a user with discounts or coupons, other incentives may be utilized to encourage the user to travel to an alternate APD machine and purchase a product or service from the alternate APD machine.

Figure 2:
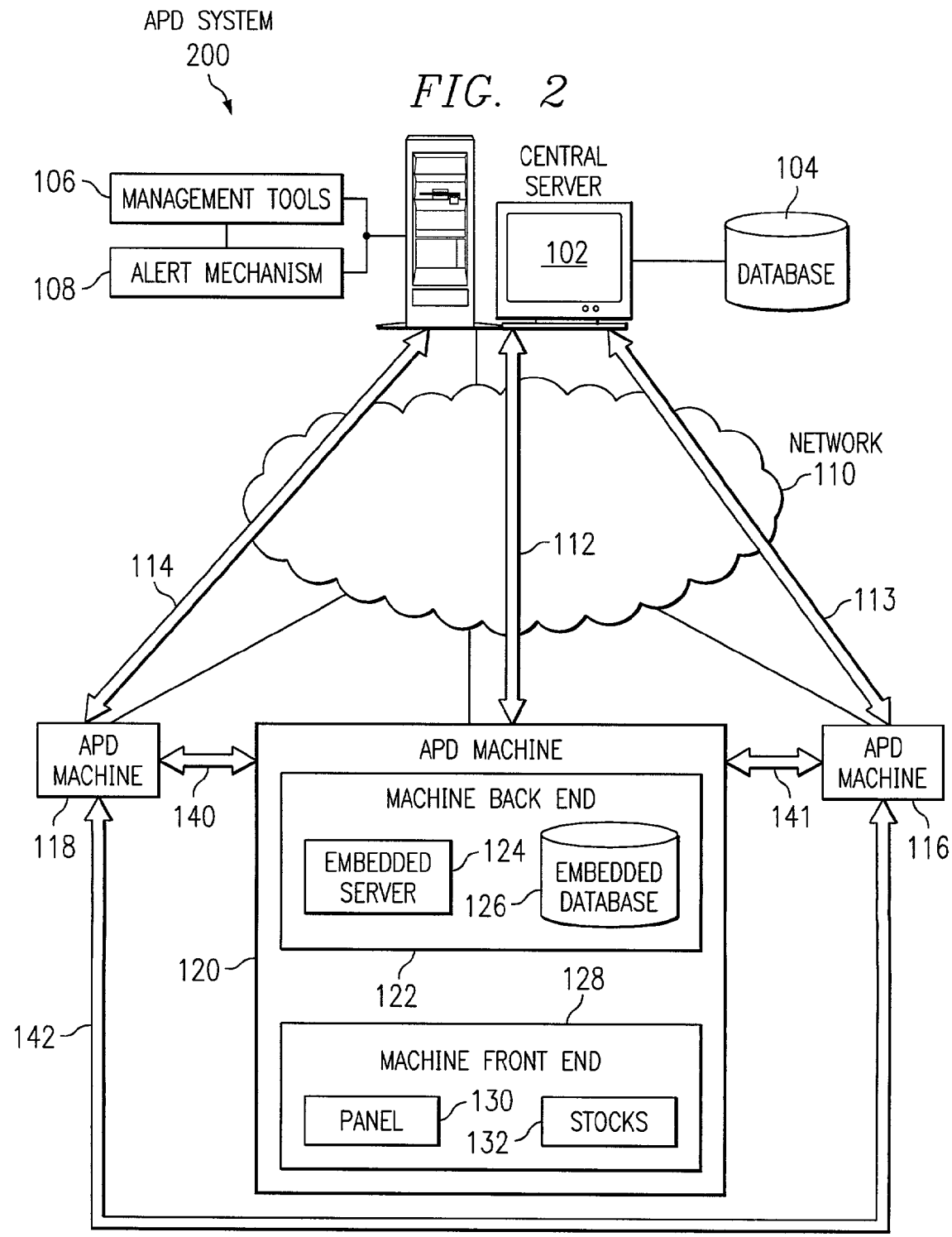
FIG. 2 depicts a block diagram of an alternative APD system in accordance with the present invention.

With reference now to FIG. 2, a block diagram of an alternative APD system is depicted in accordance with the present invention. APD system 200 is similar to APD system 100 and contains the same components. However, in addition to the ability of the APD machines 116, 118, and 120 to communicate 112-114 directly with central server 102, APD machines 116, 118, and 120 may also communicate 140-142 directly (i.e. peer-to-peer communications) with each other. Therefore, if an APD machine receives a request that it is unable to satisfy, the APD machine 116, 118, or 120 may communicate directly with the other APD machines 116, 118, and 120 to determine the identity and location of an alternative APD machine 116, 118, and 120 that is capable of satisfying the user's request.

Figure 3:
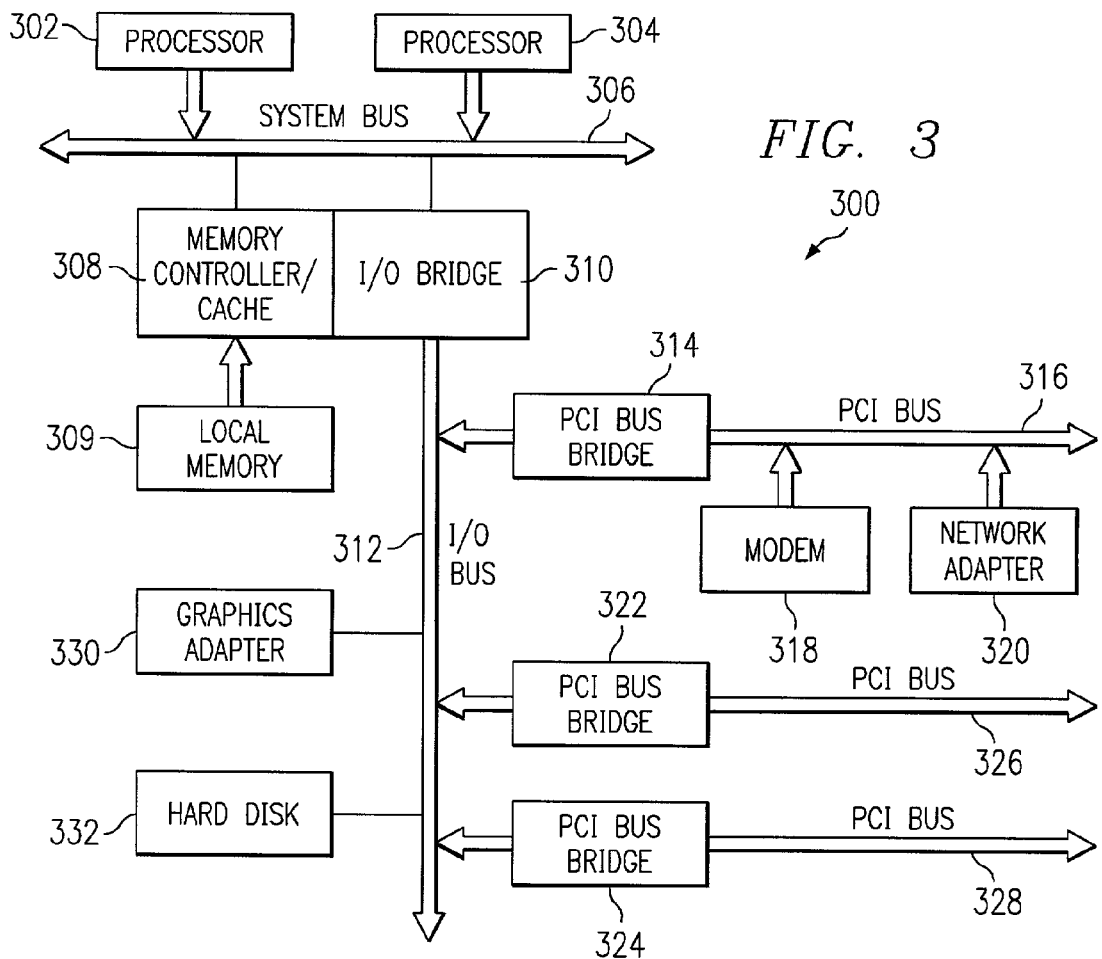
FIG. 3 depicts a block diagram of a data processing system that may be implemented as a server in accordance with a preferred embodiment of the present invention.

Referring to FIG. 3, a block diagram of a data processing system that may be implemented as a server, such as central server 102 or as embedded server 124 in FIGS. 1 and 2, is depicted in accordance with a preferred embodiment of the present invention. Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems may be connected to PCI local bus 316. Typical PCI bus implementations will support four PCI expansion slots or add-in connectors. Communications links to clients 116-120 in FIG. 1 may be provided through modem 318 and network adapter 320 connected to PCI local bus 316 through add-in boards.

Additional PCI bus bridges 322 and 324 provide interfaces for additional PCI local buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM e-Server pSeries system, a product of International Business Machines Corporation in Armonk, N.Y., running the Advanced Interactive Executive (AIX) operating system or LINUX operating system.

Figure 4:
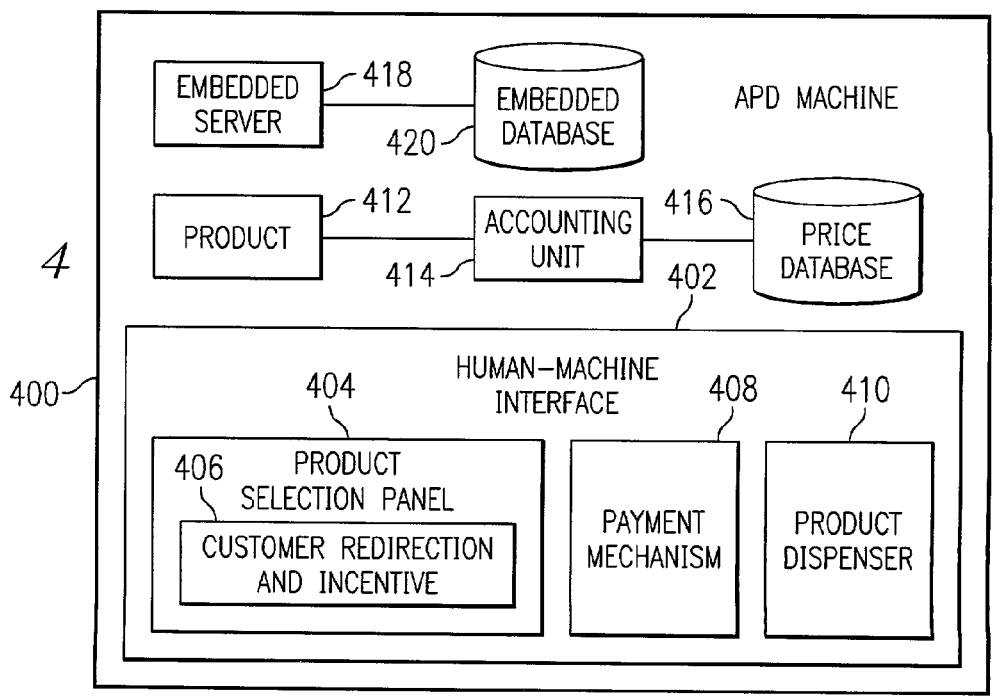
FIG. 4 depicts a block diagram of a APD machine in accordance with the present invention.

With reference now to FIG. 4, a block diagram of a APD machine is depicted in accordance with the present invention. APD machine 400 is an example of an APD machine that may be implemented as, for example, any of APD machines 116, 118, and 120 depicted in FIGS. 1 and 2. APD machine 400 includes an embedded server 418 connected to an embedded database 420, products 412, accounting unit 414, price database 416, and human-machine interface 402.

Embedded server 418 communicates with a central server and may also communicate with embedded servers within other APD machines. The current product contents of the current APD machine are stored in embedded database 420. The current product contents of other APD machines in the system may also be contained within embedded database 420. As products are purchased by users, the database 420 is updated. Products 412 contains the products offered by the APD machine 400 and is connected to accounting unit 414 that debits inventory and credits accounts as products are purchased by users. Accounting unit 416 is connected to a price database 416 that contains the current price charged for each product contained in products 412.

Human-Machine interface 402 contains a product selection panel, a payment mechanism, and a product dispenser 410. Product dispenser 410 dispenses the chosen product, if available, to the user. Product dispensers for use with APD machines are well known in the art. The product selection panel 404 allows a user to select a product or service from the APD machine 400. Product selection panel 404 also includes a customer redirection and incentive unit 406 which allows the APD machine 400 to notify a user that a product or service is unavailable, inform the user of alternative APD machines, and provide an incentive, such as a coupon, for the inconvenience of traveling to another APD machine. Payment mechanism 408, as described above, may be any of many different types of payment mechanisms, and many different types of payment mechanisms are well known in the art.

With reference now to FIG. 5, an exemplary process flow and program function updating inventories in an APD system is depicted in accordance with the present invention. To begin, each APD machine in the APD system as well as the central server is setup (step 502). The peer state repository is loaded on each APD machine (step 504). The peer state repository contains the information about the inventory and products available on each APD machine. Next, the peer state repositories are loaded onto the central server (step 506). Peers then periodically communicate with each other to exchange state information (step 508). The peer then determines whether new state information has been received from another peer (step 510). If no new information has been received, then the peer continues to periodically communicate with the other peers (step 508). If new information has been received from a peer, then the peer state repository is updated (step 512) and the APD machine continues to communicate with the other peers (step 508).

With reference now to FIG. 6, an exemplary process flow and program function for redirecting a user from an APD machine incapable of satisfying a user's request to another APD Machine capable of satisfying the user's request is depicted in accordance with the present invention. To begin, the APD machine is set up to handle peer-to-peer exchange of states (step 602). Alternatively, the APD machine can be set up to send state information to the central server and receive state information about other APD machines from the central server. Next, a user makes a selection (step 604). The APD machine then determines whether it can satisfy the user request (step 606). If the APD machine can satisfy the user request, then the product is dispensed (step 608) and the product database is updated (step 620). The APD machine then determines whether the user wishes to make another selection (step 622). If yes, then the APD machine continues with step 604. If no, then the process ends.

If the APD machine cannot satisfy the user's request, then it determines the state of peer set of APD machines (step 610) and determines whether one of the peer APD machines can satisfy the user's request (step 612). If no peer can satisfy the user's request, the user is asked whether another transaction is desired (step 622). If yes, then the APD machine continues with step 604 and the process ends if the user does not desire another transaction.

If a peer can satisfy the user's request, then the APD machine redirects the user to the nearest APD machine capable of satisfying the user's request (step 614). The appropriate economic incentives, if any, are then applied to the user (step 616) and the peer APD machine is informed of the impending user as well as any incentive offered (step 618). The APD machine then records the redirected transaction (step 620) and determines whether the user wishes to make another transaction (step 622). If the user does desire another transaction, then the APD machine continues with step 604. If the user does not desire any further transactions, then the process ends.

With reference now to FIG. 7, an exemplary process flow and program function for handling, in an APD machine, a redirected transaction from another APD machine is depicted in accordance with the present invention. To begin, the APD machine is set up to communicate with peers either directly or through exchanging information with a central server (step 702). The APD machine then enters a normal mode of operation (step 704) and determines whether a request to handle a redirection has been received (step 706). If no request to handle a redirection has been received, then the APD machine continues with normal operation (step 704).

If a request to handle a redirection has been received, then the APD machine receives information from the redirecting machine about the product requested, discount offered, and any other pertinent information (step 708). The APD machine then waits for the redirected user to make a selection (step 710) and determines whether a selection has been made (step 712). If no selection has been made by the redirected user, then the APD machine continues to wait (step 710). If a selection has been made by the redirected user, then the product is dispensed (step 714). The transaction is then recorded in the local database and other relevant databases, such as, for example, the central server database or the local database of other APD machines, are updated (step 716).

Figure 8:
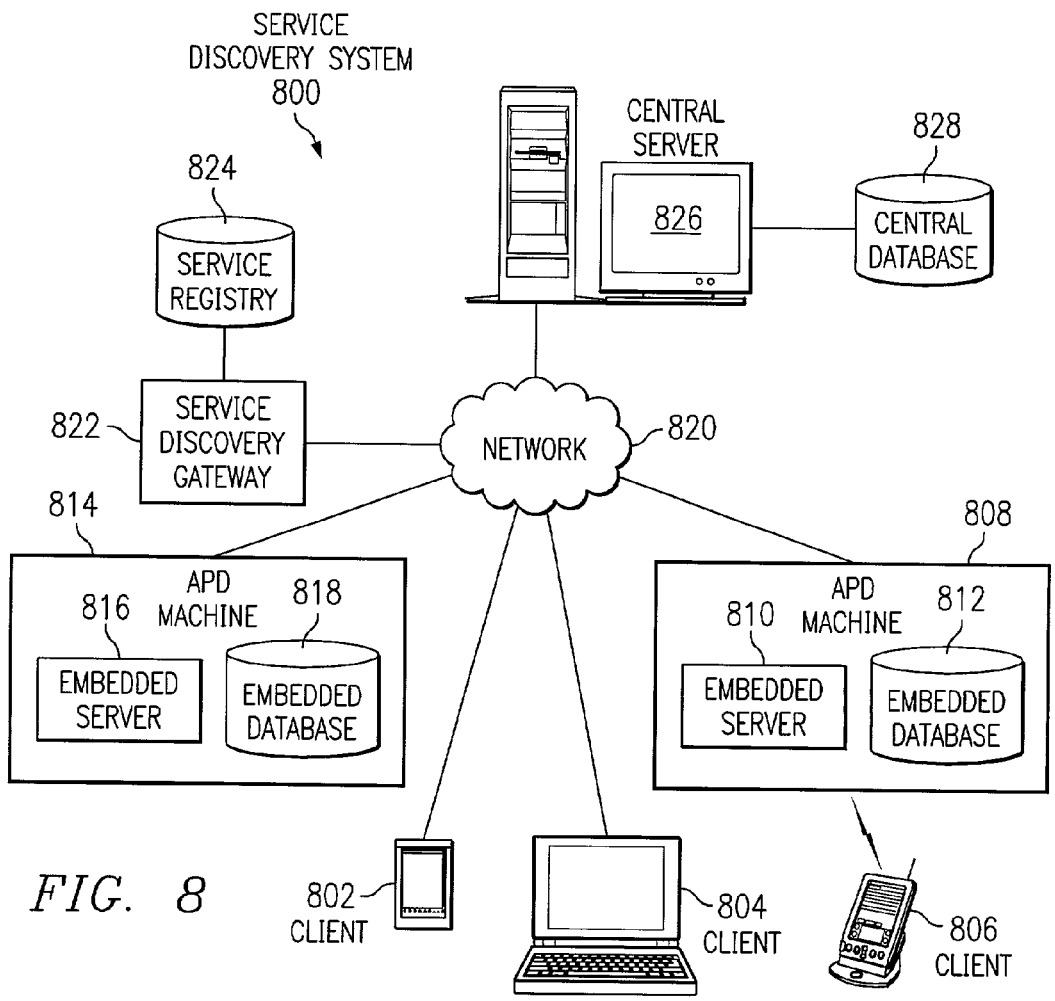
FIG. 8 depicts a block diagram of a system for allowing a user to discover available services and products within an APD system in accordance with the present invention.

With reference now to FIG. 8, a block diagram of a system for allowing a user to discover available services and products within an APD system is depicted in accordance with the present invention. Service discovery system 800 includes a central server 826 connected to a central database 828, a service discovery gateway 822 connected to a service registry 824, APD machines 808 and 814, and network 820. The service discovery gateway 822 maintains service provision records in the registry 824 and keeps updated states. Thus, the service discovery gateway 822 uses and maintains the service registry 824 to maintain an accurate reflection of currently available services in the micronetwork (e.g., a building). Service providers, such as, for example, an APD system with central server 826 and APD machines 808 and 814, may register (or deregister) their services and products with the service registry 824. The service registry 824 contains information about providers and their services and also receives updates about provided services and possible state changes.

Network 820 may be, for example, a micro network, a local area network (LAN), or a wireless network such as, for example, Bluetooth, and provides means for communication between the central server 826, service discovery gateway 822, APD machines 808 and 814, and with clients 802, 804, and 806. Each APD machine 808 and 814 includes an embedded server 810 and 816 and an embedded database 812 and 818. The central server 826, central database 828, and APD machines 808 and 814 function as described above with reference to FIGS. 1 and 2.

Upon entering an environment such as, for example, a building, theme park, or some other relatively small or self contained environment, a user may use a client 802, 804, or 806 to query a service discovery gateway 822 about the location of available services, which in the depicted case would be the location of APD machines 808 and 814 and the available products by the APD machines 808 and 814. Client 802, 804, and 806 may access the service discovery gateways 822 using, for example, Bluetooth, Infrared Data Association protocol (IrDA), Service Location Protocol (SLP), or similar protocols, to specify and discover available services and invoke them.

Thus, a user can walk into an unfamiliar environment, such as, for example, a building, and using a portable data processing system, such as any of client 802, 804, and 806 access the service discovery gateway 822 to discover the location of a vending machine, such as APD machine 814 that contains, for example, a certain type and brand of soft-drink. If the user has an infrared (IR) transmitter and receiver on the portable data processing system, then the user can aim the IR transmitter at a IR receiver and transmitter appropriately marked in the entrance or other area of the building to access the service discovery gateway 822. Alternatively, the user may enter a web universal resource locator (URL) associated with the service discovery gateway into a web browser and obtain access to the service discovery gateway via the Internet. Many other methods of accessing the service discovery gateway will be obvious to one of ordinary skill in the art. Once accessed, the service discovery gateway 822 may access the service registry 824 to discover matching services to the user's request and return to the user a reply specifying the location at which the user's requested product or service may be found within the micronetwork (e.g. the building) or with a message indicating that the requested product or service (e.g., soft-drink) is not available.

Service discovery system 800 is intended as an example of service discovery system 800 and not as an architectural limitation. Other components not shown may be used in place of or in addition to components depicted in FIG. 8.

Figure 9:
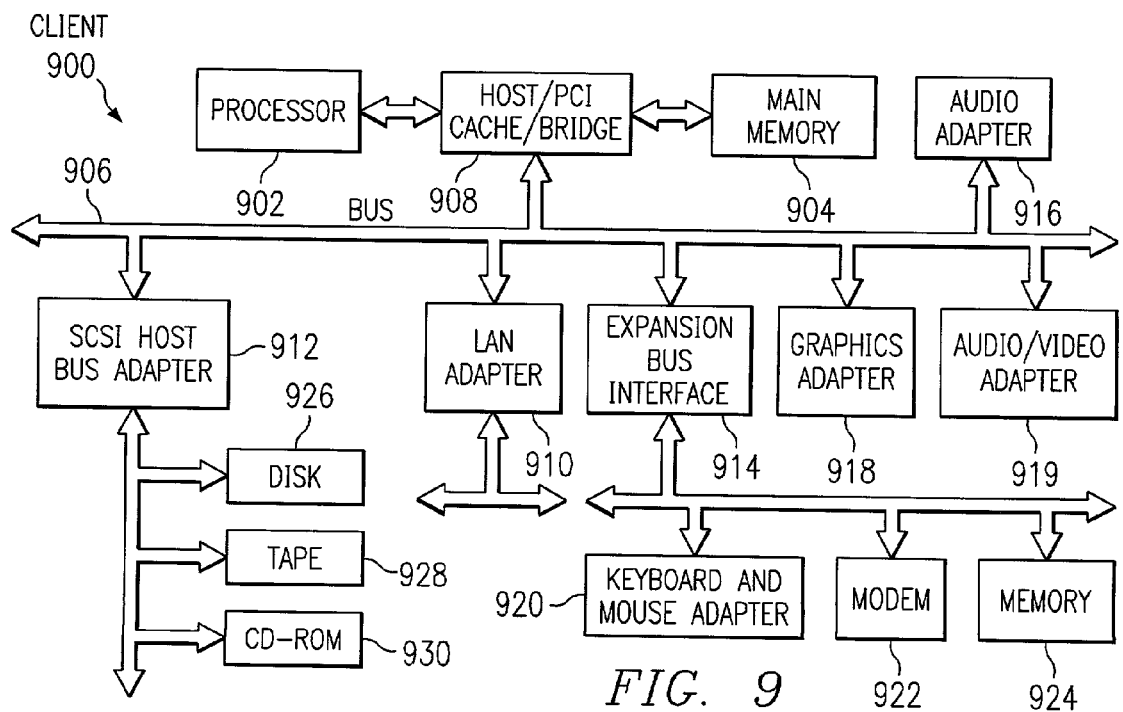
FIG. 9 depicts a block diagram illustrating a data processing system in which the present invention may be implemented.

With reference now to FIG. 9, a block diagram illustrating a data processing system is depicted in which the present invention may be implemented. Data processing system 900 is an example of a client computer which may be implemented as, for example, any of clients 802, 804, and 806 in FIG. 8. Data processing system 900 employs a peripheral component interconnect (PCI) local bus architecture. Although the depicted example employs a PCI bus, other bus architectures such as Accelerated Graphics Port (AGP) and Industry Standard Architecture (ISA) may be used. Processor 902 and main memory 904 are connected to PCI local bus 906 through PCI bridge 908. PCI bridge 908 also may include an integrated memory controller and cache memory for processor 902. Additional connections to PCI local bus 906 may be made through direct component interconnection or through add-in boards. In the depicted example, local area network (LAN) adapter 910, SCSI host bus adapter 912, and expansion bus interface 914 are connected to PCI local bus 906 by direct component connection. In contrast, audio adapter 916, graphics adapter 918, and audio/video adapter 919 are connected to PCI local bus 906 by add-in boards inserted into expansion slots. Expansion bus interface 914 provides a connection for a keyboard and mouse adapter 920, modem 922, and additional memory 924. Small computer system interface (SCSI) host bus adapter 912 provides a connection for hard disk drive 926, tape drive 928, and CD-ROM drive 930. Typical PCI local bus implementations will support three or four PCI expansion slots or add-in connectors.

An operating system runs on processor 902 and is used to coordinate and provide control of various components within data processing system 900 in FIG. 9. The operating system may be a commercially available operating system, such as Windows 2000, which is available from Microsoft Corporation. An object oriented programming system such as Java may run in conjunction with the operating system and provide calls to the operating system from Java programs or applications executing on data processing system 900. "Java" is a trademark of Sun Microsystems, Inc. Instructions for the operating system, the object-oriented operating system, and applications or programs are located on storage devices, such as hard disk drive 926, and may be loaded into main memory 904 for execution by processor 902.

Those of ordinary skill in the art will appreciate that the hardware in FIG. 9 may vary depending on the implementation. Other internal hardware or peripheral devices, such as flash ROM (or equivalent nonvolatile memory) or optical disk drives and the like, may be used in addition to or in place of the hardware depicted in FIG. 9. Also, the processes of the present invention may be applied to a multiprocessor data processing system.

As another example, data processing system 900 may be a stand-alone system configured to be bootable without relying on some type of network communication interface, whether or not data processing system 900 comprises some type of network communication interface. As a further example, data processing system 900 may be a personal digital assistant (PDA) device, which is configured with ROM and/or flash ROM in order to provide non-volatile memory for storing operating system files and/or user-generated data.

The depicted example in FIG. 9 and above-described examples are not meant to imply architectural limitations. For example, data processing system 900 also may be a notebook computer or hand held computer in addition to taking the form of a PDA. Data processing system 900 also may be a kiosk or a Web appliance.

With reference now to FIG. 10, an exemplary process flow and program function for allowing a user to discover the location of products and services available within a micronetwork is depicted in accordance with the present invention. To begin, a user enters an environment served by a micronetwork of APD machines (step 1002). A process of discovery, such as, as discussed above, pointing an IR device at an identified IR transmitter/receiver associated with the service discovery gateway (SDG), is used to locate the SDG so that the SDG and user can communicate to locate services and/or products (step 1004). The user then submits a query (step 1006) and sends the query to the SDG (step 1008).

The SDG formulates the query appropriately and submits the query to the service discovery registry for a response (step 1010). The available services are received by the SDG from the registry (step 1012) and the SDG determines whether the service can by invoked remotely (step 1014). If the service cannot be invoked remotely, then an APD machine is informed about the user's request (step 1016) and the APD machine begins communicating directly with the user (step 1018). The APD machine then sends location information and invocation mechanisms to the user (step 1020). The user then invokes the services, such as selecting a soft-drink from the APD machine, (step 1022) and is informed of the status of the request (e.g., whether the soft-drink has been dispensed, will be dispensed shortly, where to pick up the soft-drink, etc.) (step 1024). The user is then charged and accounting for the APD machine is updated (step 1026).

If the service can be invoked remotely, then the service invocation is performed remotely (step 1028) and the user informed of the status of the requested service (step 1030). The user is then charged and appropriate accounting components updated (step 1026).

In other embodiments, rather than remotely invoking services on other automated product dispensing machines within the network, the automated product machine, upon receiving a request for an item it does not have currently in stock, may provide the user with a redemption coupon for the requested product or service or for an alternative product or service. The coupon may be a physical coupon or an electronic coupon and may be redeemed at other ones of the automated product dispensing machines or at a nearby store or cafeteria. Alternatively, the APD machine may dispense an alternative product at a discount or may provide a monetary credit to the user's smart card for the inconvenience of not obtaining the desired product.

In other embodiments, rather than waiting for a user to select a product, the APD machine may detect the presence of a portable data processing system, using, for example, bluetooth, and push information regarding product availability, product location, product pricing, as well as other product information to the user's data processing system when the user enters the proximity of the micronetwork of APD machines.

With reference now to FIG. 11, a message flow diagram illustrating the discovery of services available in an environment served by a micronetwork is depicted in accordance with the present invention. To begin, a user client 1106 queries A1 the SDG 1104 to find about requested services. The SDG 1104 consults A2 a service discovery registry and responds A3 to the user client 1106 with service information. The user client 1106 then sends A4 a message to APD machine 1102 invoking the requested service using information received from the SDG 1104. The APD machine 1102 responds A5 with the requested services or information about how to complete the requested service.

With reference now to FIG. 12, a message flow diagram illustrating the process of registering an APD machine with a service discovery gateway is depicted in accordance with the present invention. To begin, the SDG 1202 discovers a new APD machine 1206 within the micronetwork and sends a message B1 to the APD machine 1206 offering to it the SDG services and describing the offered services. The APD machine 1206 then sends B2 a response to the SDG 1202 with information about the services and/or products offered by the APD machine 1206, the APD machine 1206 also sends B3 a message to the central server 1204 informing the central server 1204 about the service offer received from SDG 1202 and the APD machine's response.

Upon receiving the response B2 from APD machine 1206, the SDG 1202 updates B4 its service registry with information about the location of the APD machine 1206 and its associated services and/or products. The central server 1204, upon receiving the message B3 from the APD machine 1206, updates B5 its database with information regarding the SDG 1202. The SDG 1202 then sends a message B6 informing the APD machine that it is now included in the service discovery registry.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for providing products, the method comprising:

receiving, at a first automatic product/service dispensing machine at a location in a micronetwork of proximally located diverse automatic product/service dispensing machines, a request for an item by a user;

receiving at the first automatic product/service dispensing machine, a payment device of the user, wherein the payment device includes identity information;

responsive to a determination that the item is unavailable at the first automatic product/service dispensing machine, providing the user with redirection information regarding a location of at least one alternative automatic product/service dispensing machine in the micronetwork at which the item may be obtained;

requesting the user to select a second automatic product/service dispensing machine among the at least one alternative automatic product/service dispensing machine;

responsive to the user selecting the second automatic product/service dispensing machine, providing the identity information and notice of a discount value to be given to the user for the item to the second automatic product/service dispensing machine; and responsive to receiving the payment device of the user at the second automatic product/service dispensing machine, the second automatic product/service dispensing machine dispensing the item and deducting the discount value from a price of the item, wherein the user is charged a reduced price for the item at the second automatic product/service dispensing machine.

2. The method of claim 1, wherein the payment device comprises one of a smart card, credit card, charge card and debit card.

3. A computer program product in a computer readable media for use in a data processing system for providing products, the computer program product comprising:

first instructions for receiving, at a first automatic product/service dispensing machine at a location in a micronetwork of proximally located diverse automatic product/service dispensing machines, a request for an item by a user;

second instructions for receiving at the first automatic product/service dispensing machine, a payment device of the user, wherein the payment device includes identity information;

third instructions, responsive to a determination that the item is unavailable at the first automatic product/service dispensing machine, for providing the user with redirection information regarding a location of at least one alternative automatic product/service dispensing machine in the micronetwork at which the item may be obtained;

fourth instructions for requesting the user to select a second automatic product/service dispensing machine among the at least one alternative automatic product/service dispensing machine;

fifth instructions, responsive to the user selecting the second automatic product/service dispensing machine, for providing the identity information and notice of a discount value to be given to the user for the item to the second automatic product/service dispensing machine; and sixth instructions, responsive to receiving the payment device of the user at the second automatic product/service dispensing machine, for the second automatic product/service dispensing machine to dispense the item and deduct the discount value from a price of the item, wherein the user is charged a reduced price for the item at the second automatic product/service dispensing machine.

4. The computer program product of claim 3, wherein the payment device comprises one of a smart card, credit card, charge card and debit card.

5. A system for providing products, the system comprising:

means for receiving, at a first automatic product/service dispensing machine at a location in a micronetwork of proximally located diverse automatic product/service dispensing machines, a request for an item by a user;

means for receiving at the first automatic product/service dispensing machine, a payment device of the user, wherein the payment device includes identity information;

means, responsive to a determination that the item is unavailable at the first automatic product/service dispensing machine, for providing the user with redirection information regarding a location of at least one alternative automatic product/service dispensing machine in the micronetwork at which the item may be obtained;

means for requesting the user to select a second automatic product/service dispensing machine among the at least one alternative automatic product/service dispensing machine;

means responsive to the user selecting the second automatic product/service dispensing machine, for providing the identity information and notice of a discount value to be given to the user for the item to the second automatic product/service dispensing machine; and means responsive to receiving the payment device of the user at the second automatic product/service dispensing machine, for the second automatic product/service dispensing machine to dispense the item and deduct the discount value from a price of the item, wherein the user is charged a reduced price for the item at the second automatic product/service dispensing machine.

6. The system of claim 5, wherein the payment device comprises one of a smart card, credit card, charge card and debit card.

* * * * *